Figure 1:
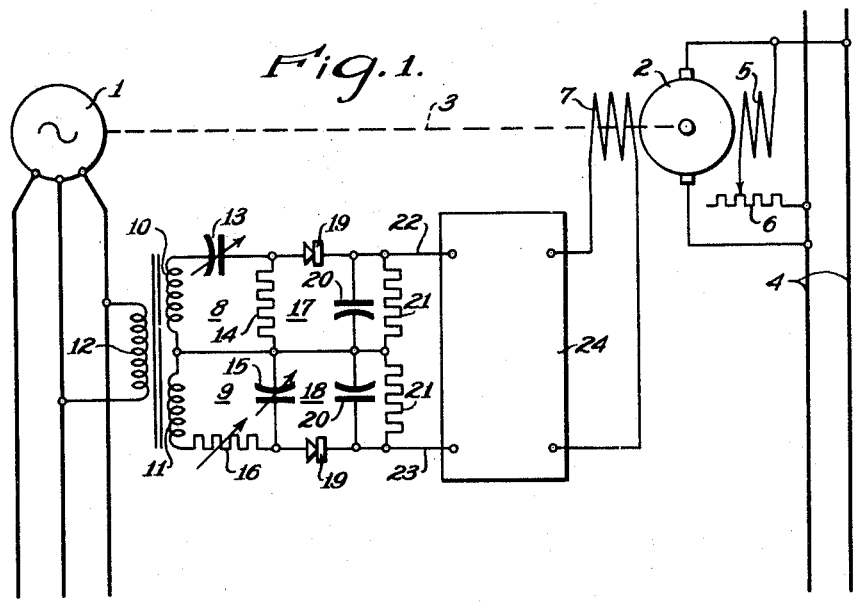

Feb. 7, 1950   S. L. LINDBECK ET AL   2,496,730
FREQUENCY SENSITIVE NETWORK
Filed May 13, 1947

WITNESSES:
Robert C. Baird
W. C. Young

INVENTORS
Simon L. Lindbeck and
William O. Osbon.
BY
Paul E. Friedemann
ATTORNEY Patented Feb. 7, 1950

2,496,730

UNITED STATES PATENT OFFICE 2,496,730

FREQUENCY SENSITIVE NETWORK

Simon L. Lindbeck, Wilkinsburg, and William O. Osbon, Pittsburgh, Pa., assignors to Westinghouse Electric Corporation, East Pittsburgh, Pa., a corporation of Pennsylvania Application May 13, 1947, Serial No. 747,784

5 Claims. (Cl. 322—32)

This invention relates to a regulating system and, more particularly, to a frequency regulating system which may be used alternatively to regulate the frequency of an alternating current generator or the speed of a prime mover such as a direct-current motor.

One of the principal objects of the invention is to provide a control apparatus which operates in response to changes in the frequency of current produced by an alternating current generator to vary the speed of a prime mover driving the generator in a direction effective to maintain the frequency at a predetermined value. Since the frequency of the current produced by the generator bears a linear relation to the speed of the prime mover, the maintenance of the frequency at a predetermined value will involve maintaining the speed of the prime mover at a corresponding predetermined value.

A further object of the invention is to provide a frequency responsive regulating circuit which is normally inoperative to vary the operation of an alternating-current generator when the current produced thereby is at a predetermined frequency but which will be effective to regulate its operation when its frequency varies from the predetermined value.

A still further object of the invention is to provide a frequency responsive regulating circuit for maintaining a generated current at a predetermined frequency which is adjustable to vary the frequency to be regulated.

Another object of the invention is to provide a regulating circuit of the character referred to having at least two branches which respond differently to a given change in frequency, the difference in response being utilized to regulate the frequency of current generated by a generator.

Another object of the invention is to provide a pair of reactance circuits in which the voltages vary in inverse relation to changes in frequency and in which the voltages are equal at a predetermined frequency together with regulating apparatus responsive to a difference in the voltages in said circuits for regulating the output frequency of an alternating current generator.

Other objects and advantages will become apparent from the following description.

Figure 2:
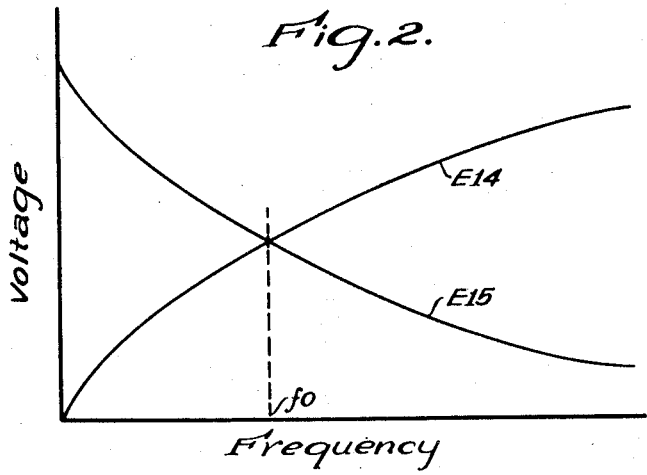

In the drawing, there is shown a preferred embodiment of the invention. In this showing:

Figure 1 is a diagrammatic view of a frequency regulating system constructed in accordance with the principles of this invention; and Fig. 2 is an explanatory curve.

Referring to the drawing, the numeral 1 designates an alternating-current generator mechanically connected to a prime mover or direct-current motor 2 as diagrammatically indicated by the broken line 3. The motor 2 has its armature terminals connected across a suitable source of direct-current such as the supply lines 4. A field winding 5 is also connected across the lines 4 through an adjustable resistor 6 which is operable to vary the excitation strength of the winding 5 and thereby the speed of the motor 2 and the frequency of the alternating current generated by the generator 1. The motor 2 is provided with an additional field winding 7 which operates to regulate the speed of the motor 2 and thereby the frequency of the alternating current from the generator 1 in a manner to be described.

Energization of the field winding 7 is under the control of a pair of circuits 8 and 9. The circuits 8 and 9 are provided with secondary windings 10 and 11, respectively, which are energized by the primary winding 12 connected across the output circuit of the generator 1. In this manner there is provided a transformer electrically connecting the circuits 8 and 9 to the generator 1. Any other suitable arrangement for connecting the circuits 8 and 9 to the generator 1 effective to supply such circuits with an alternating current at a frequency the same as generated by the generator 1 may be employed in place of the transformer arrangement illustrated.

The circuit 8 is provided with an adjustable condenser 13 and an adjustable resistor 14 in series with its secondary winding 10. Similarly, the circuit 9 is provided with an adjustable condenser 15 and an adjustable resistor 16 in series with its secondary winding 11. The circuits 8 and 9 are provided with output circuits 17 and 18, respectively. Each of the output circuits is provided with a rectifier 19 and a condenser 20 and resistance 21 to provide a filtering action on the current passed by the rectifier 19. Leads 22 and 23 connect the output circuits 17 and 18 to a direct-current amplifier 24 for a purpose to be described. In the preferred arrangement, the impedances offered by output circuits 17 and 18 to the flow of current is high under operating conditions compared to the impedances offered by circuits 8 and 9, respectively.

It will be noted that the output circuit 17 is connected across the resistor 14 of the circuit 8, and the output circuit 18 is connected across the condenser 15 of the circuit 9. In this manner, the voltage fed to the output circuit 17 corresponds to the voltage drop across the resistor 14. Similarly, the voltage impressed on the output circuit 18 corresponds to the voltage drop across the condenser 15. As will become apparent, the voltage drops across the circuit elements 14 and 15 are the same only when the frequency of the current supplied thereto is at a predetermined value, and such voltage drops vary in inverse fashion for frequencies above and below the predetermined value. By adjusting the elements of the circuits 7 and 8, the frequency at which the voltage drops across the elements 14 and 15 are equal may be readily varied. Adjustment of such elements may also be made to balance the voltage drops across the elements 14 and 15 for a predetermined frequency.

The manner in which the voltage drops across the elements 14 and 15 vary with changing frequencies will be best understood by referring to Fig. 2. In this showing, the curve E14 shows the variation of voltage drop across the resistor 14 and the curve E15 shows the variation of voltage drop across the condenser 15 with changing frequencies. The voltage drops indicated by the curves E14 and E15 also indicate the voltage fed to the output circuits 17 and 18. The circuits 17 and 18 constantly compare the voltages fed thereto by rectifying such voltages and combining these voltages in series opposition through the input leads 22 and 23 to the direct-current amplifier 24. By this arrangement, when the drop across the resistor 14 is equal to the drop across the condenser 15 due to the output of the generator 1 being at a predetermined frequency, the net result fed to the amplifier 24 will be zero. For other frequencies, such drops will differ, and the intelligence fed by the leads 22 and 23 to the amplifier 24 will correspond to the difference in such voltage drops.

It will be noted that the curves E14 and E15 vary in inverse fashion with changing frequencies. This is due to the fact that the reactance elements of the circuits are arranged in inverse relation. For circuit 8, the effective value of the voltage drop E14 across resistance 14 will equal the product of the impressed voltage E10 from secondary winding 10, and the ratio of the resistance offered by the resistor 14 with respect to the square root of the sum of the squares of the resistance of resistor 14 and the reactance of capacitor 13. This may be expressed mathematically as follows:

$$E14 = \frac{R1}{\sqrt{R1^2 + \left(\frac{1}{2\pi fC1}\right)^2}} E10 \qquad (1)$$

where R1 is the resistance of the resistor 14, C1 is the capacitance of the condenser 13, and $f$ is the frequency of the impressed voltage.

Similarly for circuit 9, E15, the voltage across condenser 15, may be expressed as $$E15 = \frac{\frac{1}{2\pi fC2}}{\sqrt{R2^2 + \left(\frac{1}{2\pi fC2}\right)^2}} E11 \qquad (2)$$

where E11 is the voltage from secondary 11, R2 is the resistance of the resistor 16, C2 is the capacitance of the condenser 15, and $f$ is the frequency of the impressed voltage. Curves E14 and E15 of Fig. 2 are graphs of Equations 1 and 2, respectively.

It can be shown that E14 equals E15 (this being the preferred operating condition) when the values of capacitors C1 and C2 and resistors R1 and R2 are related to the desired frequency $f_o$ of generator 1 in the following manner:

$$(2\pi f_o)^2 = \frac{1}{C1R1C2R2} \qquad (3)$$

In the preferred operating condition, the regulating winding 7 will be deenergized when the motor 2 is operating at the proper speed to cause the generator 1 to produce current at the desired frequency $f_o$. With the generator 1 operating at the desired frequency, the voltage drops across the elements 14 and 15 will be equal, and, since the leads 22 and 23 supply the amplifier 24 with intelligence corresponding to the difference of such voltage drops, there will be no corrective effect fed to the regulating winding 7. In the event that the frequency of current generated by the generator 1 increases to a value above the desired frequency, due to a disturbance such as a reduction in load on generator 1, this fact will be transmitted to the regulating winding 7 through the amplifier 24. Under this condition, the excitation supplied by the winding 7 will be additive to that supplied by the winding 5 and the increased excitation on the motor 2 will be effective to decrease its speed and thereby the frequency of current generated by the machine 1. In the event that the frequency of current generated by the generator 1 falls below the desired frequency $f_o$ at which the curves E14 and E15 intersect, then the difference of voltages supplied to the leads 22 and 23 will be in an opposite direction and the amplifier 24 will energize the regulating winding 7 in an opposite direction. Under this condition, the excitation supplied by the winding 7 will substract from that supplied by the winding 5 to thereby decrease the total excitation on the motor 5 and increase its speed thus tending to return the frequency of the generator 1 to the desired frequency.

It will be apparent from the above that the greater the change in voltage between leads 22 and 23 per unit deviation in frequency from the desired value, the greater will be the effect of the regulating winding in tending to restor the frequency to the desired value. The change in voltage between leads 22 and 23 per unit deviation in frequency depends upon the sensitivity of circuits 8 and 9. It can be shown that the maximum sensitivity is realized when $C2R2 = 2C1R1$. This is thus a preferred condition since, with all other conditions constant, it will result in minimum deviation of the generator frequency from the desired value.

From the foregoing, it will be apparent that the regulating action provided by the circuits 8 and 9 on the motor 5 is effective to maintain the frequency of the generator within very close limits at a predetermined value which may be varied by adjusting the elements of the circuits 7 and 8 in accordance with Equation 3 and to thereby vary the point at which the curves E14 and E15 intersect. Since the frequency of the current generated by the generator 1 is a linear function of the speed of its prime mover, it will also be apparent that the regulating system of this invention may be readily adapted to an application wherein the speed of a prime mover is to be regulated within close limits.

Since certain changes may be made in the above-described construction and different embodiments of the invention may be made without departing from the spirit and scope thereof, it is intended that all matter contained in the foregoing description or shown in the accompanying drawing shall be interpreted as illustrative and not in a limiting sense.

We claim as our invention:

1. A regulating system of the character described comprising, in combination, an alternating-current generator, a pair of circuits electrically connected respectively to said generator, each of said circuits having a resistance element and a reactance element connected in series together with an output circuit bridging one of said elements, said output circuits being arranged to bridge the resistance element in one of said first-named circuits and to bridge the reactance element in the other of said first-named circuits whereby the voltages fed to said output circuits will be equal at a predetermined frequency and will vary in opposite directions for frequencies above and below said predetermined frequency, and means responsive to a difference in the voltages in said output circuits for regulating the operation of said generator to maintain the frequency of the current generated thereby at said predetermined frequency.

2. A regulating system of the character described comprising, in combination, an alternating-current generator, a pair of circuits electrically connected respectively to said generator, each of said circuits having a resistance element and a reactance element connected in series together with an output circuit bridging one of said elements, said output circuits being arranged to bridge the resistance element in one of said first-named circuits and to bridge the reactance element in the other of said first-named circuits whereby the voltages fed to said output circuits will be equal at a predetermined frequency and will vary in opposite directions for frequencies above and below said predetermined frequency, at least one of said elements being adjustable so that the relative impedance characteristics of said first-named circuits may be adjusted to vary the predetermined frequency at which the voltages fed to said output circuits are equal, and means responsive to a difference in the voltages in said output circuits for regulating the operation of said generator to maintain the frequency of the current generated thereby at said predetermined frequency.

3. A regulating system of the character described comprising, in combination, an alternating-current generator, a transformer having a primary winding connected to the output circuit of said generator and a pair of secondary windings, each of said secondary windings having a resistance element and a reactance element connected in series therewith, an output circuit bridging the resistance element connected to one of said secondary windings, an output circuit bridging the reactance element connected to the other of said secondary windings, each of said output circuits having rectifier and filtering means therein, said output circuits having equal voltages when said generator is operating at a predetermined frequency, and means responsive to a voltage difference in said output circuits for regulating the operation of said generator to maintain the current generated thereby at said predetermined frequency.

4. A regulating system of the character described comprising, in combination, an alternating-current generator, a prime mover for driving said generator, means for regulating the speed of said prime mover to thereby regulate the frequency of the current generated by said generator, a transformer having a primary winding connected to the output circuit of said generator and a pair of secondary windings, each of said secondary windings having a resistance element and a reactance element connected in series therewith, an output circuit bridging the resistance element connected to one of said secondary windings, an output circuit bridging the reactance element connected to the other of said secondary windings, each of said output circuits having rectifier and filtering means therein, said output circuits having equal voltages when said generator is operating at a predetermined frequency, and means responsive to a voltage difference in said output circuits for operating said regulating means and thereby the operation of said prime mover to maintain the alternating current generated by said generator at said predetermined frequency.

5. A regulating system of the character described comprising, in combination, an alternating-current generator, a prime mover for driving said generaor, means for regulating the speed of said prime mover to thereby regulate the frequency of the current generated by said generator, a pair of circuits electrically connected respectively to said generator, each of said circuits having a resistance element and a reactance element connected in series together with an output circuit bridging one of said elements, said output circuits being arranged to bridge the resistance element in one of said first-named circuits and to bridge the reactance element in the other of said first-named circuits whereby the voltages fed to said output circuits will be equal at a predetermined frequency and will vary in opposite directions for frequencies above and below said predetermined frequency, and means responsive to a difference in the voltages in said output circuits for operating said regulating means and thereby the operation of said prime mover to maintain the alternating current generated by said generator at said predetermined frequency.

SIMON L. LINDBECK.
WILLIAM O. OSBON.

REFERENCES CITED

The following references are of record in the file of this patent:

UNITED STATES PATENTS

| Number | Name | Date |
| --- | --- | --- |
| Re. 20,548 | Doyle | Nov. 9, 1937 |
| 1,691,222 | Bohm | Nov. 13, 1928 |
| 1,981,040 | Gulliksen | Nov. 20, 1934 |
| 2,431,501 | Phillips | Nov. 25, 1937 |